United States Patent
Charlet et al.

(10) Patent No.: US 10,650,019 B2
(45) Date of Patent: *May 12, 2020

(54) MANAGING DATA CONVERSION FOR USER-DEFINED DATA TYPES WITHIN A DATABASE MANAGEMENT SYSTEM

(71) Applicant: International Business Machines Corporation, Armonk, NY (US)

(72) Inventors: Kyle J. Charlet, Morgan Hill, CA (US); Nathan D. Church, San Jose, CA (US); Kevin D. Hite, San Jose, CA (US); Richard V. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 14/199,581

(22) Filed: Mar. 6, 2014

(65) Prior Publication Data

US 2015/0254315 A1    Sep. 10, 2015

(51) Int. Cl.
  *G06F 16/00*    (2019.01)
  *G06F 16/25*    (2019.01)
  *G06F 16/245*   (2019.01)

(52) U.S. Cl.
  CPC .......... *G06F 16/258* (2019.01); *G06F 16/245* (2019.01)

(58) Field of Classification Search
  CPC .......... G06F 16/11; G06F 16/84; G06F 16/86; G06F 16/116; G06F 16/164;
  (Continued)

(56) References Cited

U.S. PATENT DOCUMENTS 6,167,565 A * 12/2000 Kanamori ............... G06F 9/547
                                                    707/999.103
6,381,600 B1 * 4/2002 Lau ....................... G06F 16/284
                                                    707/999.01
(Continued)

OTHER PUBLICATIONS

Pani et al.; "A Revitalized Interprocedural Slicing in the Presence of Derived and User Defined Data Types", IACC/IEEE 2nd International Conference on, Feb. 19-20, 2010, pp. 60-65.
(Continued)

*Primary Examiner* — Mark E Hershley
*Assistant Examiner* — Rezwanul Mahmood
(74) *Attorney, Agent, or Firm* — Mollborn Patents, Inc.; Fredrik Mollborn

(57) ABSTRACT

Managing data conversion for user-defined data types within a DBMS. A custom data type definition and one or more converters are stored within a database management system. Each converter can convert instances of the custom data type between a binary format and a programming language format. The database management system receives a request for a custom data type instance in a specified programming language format. A converter among the one or more converters converts the custom data type instance expressed in the binary format into a custom data type instance expressed in the specified programming language format, using a custom data type definition from the database management system. The request is responded to with the converted custom data type instance in the specified programming language format.

13 Claims, 3 Drawing Sheets

(58) Field of Classification Search
CPC .... G06F 16/211; G06F 16/217; G06F 16/235; G06F 16/245; G06F 16/252; G06F 16/254; G06F 16/256; G06F 16/258; G06F 16/288; G06F 16/2291; G06F 16/2425; G06F 16/2433; G06F 16/2445; G06F 16/2448; G06F 16/2455; G06F 16/2471; G06F 16/3331; G06F 16/24534; G06F 16/24564; G06F 16/24568

See application file for complete search history.

(56) References Cited

U.S. PATENT DOCUMENTS

| | | | | |
|---|---|---|---|---|
| 6,505,211 | B1* | 1/2003 | Dessloch | G06F 9/4493 707/812 |
| 7,421,621 | B1* | 9/2008 | Zambrana | G06F 11/3612 714/38.14 |
| 7,539,688 | B2* | 5/2009 | Sezgin | G06F 7/00 707/999.004 |
| 7,596,576 | B2* | 9/2009 | Venkatesh | G06F 7/00 707/999.2 |
| 7,620,526 | B2* | 11/2009 | Back | G01N 33/94 707/999.1 |
| 7,650,346 | B2* | 1/2010 | Henaire | G06Q 20/40 707/690 |
| 7,653,652 | B2* | 1/2010 | Kagalwala | G06F 16/211 707/999.103 |
| 7,668,963 | B1* | 2/2010 | Miner | H04N 7/16 709/231 |
| 7,765,239 | B2 | 7/2010 | Rajan et al. | |
| 8,015,217 | B2 | 9/2011 | Challapalli et al. | |
| 8,332,373 | B1 | 12/2012 | Milby | |
| 8,510,341 | B2 | 8/2013 | Weinberg et al. | |
| 9,378,226 | B1* | 6/2016 | Wu | G06F 16/211 |
| 9,507,820 | B1* | 11/2016 | Hannah | G06F 16/245 |
| 9,652,312 | B2* | 5/2017 | Selig, IV | G06F 9/44505 |
| 10,025,588 | B1* | 7/2018 | Tran | G06F 16/2291 |
| 2001/0056460 | A1* | 12/2001 | Sahota | G06F 16/9577 709/201 |
| 2002/0123993 | A1* | 9/2002 | Chau | G06F 16/86 707/999.005 |
| 2002/0174128 | A1* | 11/2002 | Govindarajan | G06F 16/289 707/999.1 |
| 2003/0105732 | A1* | 6/2003 | Kagalwala | G06F 16/211 707/999.001 |
| 2003/0145008 | A1* | 7/2003 | Burrell | G06F 11/2289 707/999.1 |
| 2004/0172484 | A1* | 9/2004 | Hafsteinsson | H04L 29/06 709/246 |
| 2004/0249830 | A1* | 12/2004 | Sonkin | G06F 8/30 707/999.1 |
| 2004/0267766 | A1 | 12/2004 | Marek et al. | |
| 2005/0149543 | A1* | 7/2005 | Cohen | G06Q 30/08 707/999.1 |
| 2005/0177589 | A1* | 8/2005 | Venkatesh | G06F 7/00 707/999.102 |
| 2005/0251812 | A1* | 11/2005 | Hayward | G06F 16/258 719/328 |
| 2007/0136332 | A1 | 6/2007 | Nolan | |
| 2007/0239818 | A1* | 10/2007 | Liou | G06F 16/275 709/201 |
| 2007/0247464 | A1* | 10/2007 | Wylie | G06Q 30/0202 345/442 |
| 2008/0301703 | A1* | 12/2008 | Nixon | G06F 8/38 719/312 |
| 2008/0313532 | A1* | 12/2008 | Dames | G06F 17/2247 715/239 |
| 2009/0006083 | A1* | 1/2009 | Bachand | G10L 15/22 704/201 |
| 2009/0112902 | A1* | 4/2009 | Sthanikam | G06F 16/80 707/999.101 |
| 2009/0171997 | A1* | 7/2009 | Challapalli | G06F 16/258 707/999.101 |
| 2009/0187585 | A1* | 7/2009 | Mathur | G06F 17/2211 707/999.1 |
| 2009/0198651 | A1* | 8/2009 | Shiffer | G06F 16/254 707/999.003 |
| 2009/0300054 | A1* | 12/2009 | Fisher | G06F 16/84 707/999.102 |
| 2010/0023542 | A1 | 1/2010 | Devanathan et al. | |
| 2010/0094829 | A1* | 4/2010 | Castellanos | G06F 16/217 707/705 |
| 2010/0185701 | A1 | 7/2010 | Ramamurthi et al. | |
| 2010/0211598 | A1 | 8/2010 | Martinez et al. | |
| 2011/0066617 | A1 | 3/2011 | Liu et al. | |
| 2011/0282914 | A1* | 11/2011 | Block | H04L 67/10 707/796 |
| 2012/0310989 | A1* | 12/2012 | Weissman | G06Q 10/063112 707/793 |
| 2013/0125232 | A1* | 5/2013 | Hogan | G05B 19/0423 726/19 |
| 2013/0132826 | A1* | 5/2013 | Kim | G06F 16/86 715/239 |
| 2013/0144896 | A1* | 6/2013 | Kim | G06F 17/2247 707/756 |
| 2013/0159970 | A1 | 6/2013 | Welicki et al. | |
| 2014/0095550 | A1* | 4/2014 | Rantanen | G06F 16/116 707/809 |
| 2014/0188917 | A1* | 7/2014 | Hopkins | G06F 16/367 707/756 |
| 2015/0178342 | A1* | 6/2015 | Seering | H04L 67/2823 707/754 |
| 2015/0254316 | A1* | 9/2015 | Charlet | G06F 16/245 707/756 |
| 2016/0004578 | A1* | 1/2016 | Selig, IV | G06F 9/44505 719/313 |
| 2016/0004758 | A1* | 1/2016 | Block | H04L 67/10 707/756 |
| 2016/0171026 | A1* | 6/2016 | Charlet | G06F 16/2365 707/602 |
| 2016/0188686 | A1* | 6/2016 | Hopkins | G06F 16/258 707/602 |
| 2017/0220613 | A1* | 8/2017 | Gass | G06F 16/2282 |
| 2017/0286412 | A1* | 10/2017 | Mohanty | G06F 16/27 |
| 2017/0337561 | A1* | 11/2017 | Curtis | G06Q 30/016 |
| 2018/0121527 | A1* | 5/2018 | Hsu | G06F 16/258 |
| 2018/0357273 | A1* | 12/2018 | Srivastava | G06F 16/289 |
| 2019/0065553 | A1* | 2/2019 | Young | G06F 16/24547 |

OTHER PUBLICATIONS

IP.COM et al.; "System and Method to Dynamically Create Optimum Mining Flows in a Strongly Typed Analytics System", IPCOM000226486D, Apr. 8, 2013, pp. 1-4.

Ma et al.; "TYPifier: Inferring the Type Semantics of Structured Data", ICDE/IEEE 29th International Conference on, Apr. 8-12, 2013, pp. 206-217.

USPTO Office Action; U.S. Appl. No. 14/636,320; Notification Date Mar. 1, 2016.

USPTO Office Action; U.S. Appl. No. 14/636,320; Notification Date Jul. 1, 2016.

USPTO Office Action; U.S. Appl. No. 14/636,320; Notification Date Jan. 11, 2017.

USPTO Office Action; U.S. Appl. No. 14/636,320; Notification Date Aug. 16, 2017.

* cited by examiner

MANAGING DATA CONVERSION FOR USER-DEFINED DATA TYPES WITHIN A DATABASE MANAGEMENT SYSTEM

BACKGROUND

The present invention relates to Database Management Systems (DBMS), and more specifically, to managing data conversion for user-defined data types within a DBMS. Current DBMSs do not offer any functionality that allows for marshaling and unmarshaling of custom data types, nor do they allow comparison of these custom data types. User defined types (UDTs) are supported by many DBMSs, but they are either structured data types or distinct objects made up of built-in data types that are already supported by the DBMS.

Custom data types (CDTs) are defined as a data type that cannot be expressed as a series of built-in data types already supported by the DBMS. One example of a CDT is a bit string, where each bit represents a pre-determined value. CDTs are handled in applications and are typically stored in a database as a so-called Large Object (LOB) or, as in the previous example of a bit string, as a binary data type. There is no meaning associated with the LOB or binary data type. The meaning is handled at the application layer.

It can be difficult to manage the sharing of information and data conversion code for CDTs across an enterprise. CDTs require custom code (i.e., a type converter) to read and write the data from a DBMS to the calling application. As a consequence, it may be necessary to have type converters for the same data type in multiple programming languages as well as support various versions of the type converter code.

A known solution for custom data types in the Java™ programming language is that the Java Database Connectivity (JDBC) protocol allows for the storage of Java Objects directly into the DBMS through Java serialization. However, this solution is not language independent and other programming languages therefore need to know how to read and instantiate the Java object. It also requires the Java class definition to be available in the class path of each calling application.

The Structured Query Language (SQL) provides support for UDTs that are constructs made up of existing SQL Types. However, this solution does not provide the flexibility for a completely unique data type that is not based on any SQL Types. Similar solutions exist for other languages, such as the .NET language, that is, the solution is made up of database built-ins and applies only to the .NET language. The UDT must exist in the application itself and cannot be loaded dynamically from the DBMS.

SUMMARY

According to one aspect of the present invention, techniques are provided for managing data conversion for user-defined data types within a DBMS. A custom data type definition and one or more converters are stored within a database management system. Each converter can convert instances of the custom data type between a binary format and a programming language format. The database management system receives a request for a custom data type instance in a specified programming language format. A converter among the one or more converters converts the custom data type instance expressed in the binary format into a custom data type instance expressed in the specified programming language format, using a custom data type definition from the database management system. The request is responded to with the converted custom data type instance in the specified programming language format.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
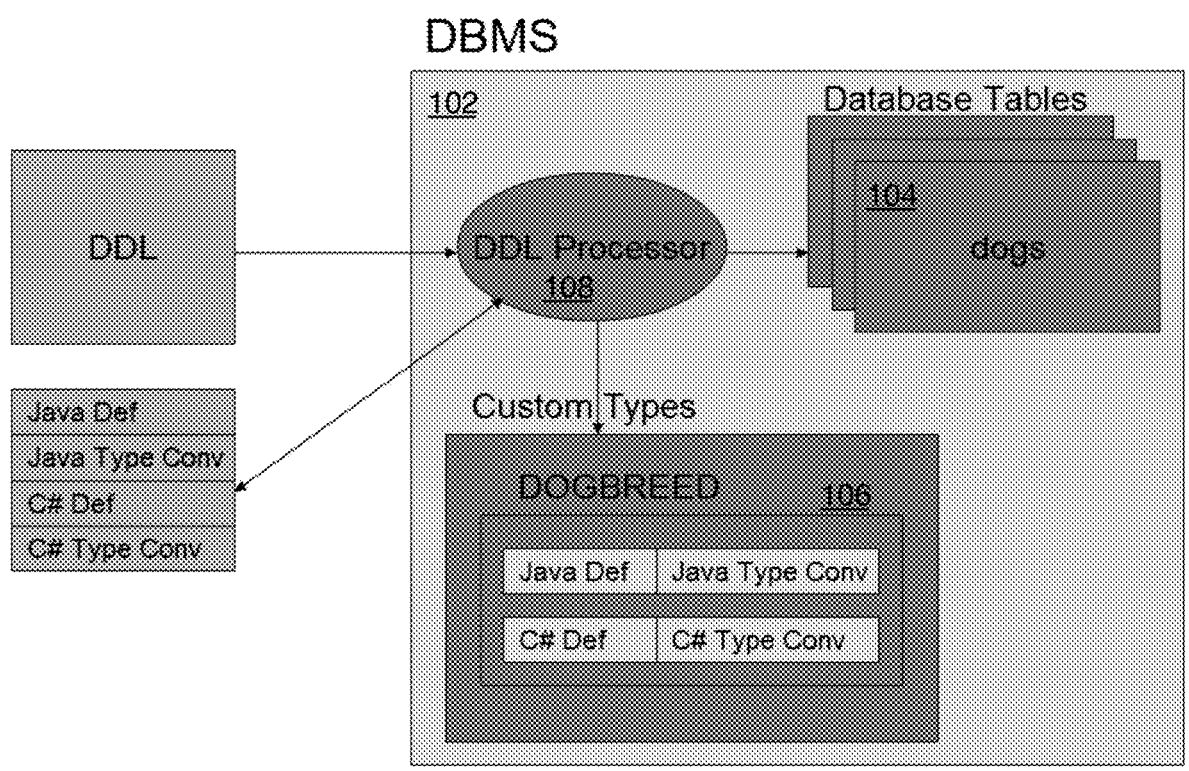
FIG. 1 shows schematically how a custom data type and type converters are stored in a database management system, in accordance with on embodiment.

The various embodiments of the invention described herein provide a detailed framework for a DBMS to provide support for CDTs. In one embodiment, the framework has two main components. The first component includes a DBMS interface that provides the calling application with a definition of the CDT in the requested programming language, such that the calling application can instantiate and understand the CDT. The second component includes a query engine call back interface, which allows the DBMS query engine to access the user implementation of the data conversion interface for the CDT for a requested programming language, which also includes the ability to compare two objects of the CDT.

One benefit of this two-component framework is that the framework allows custom data types to be supported by the DBMS for multiple programming languages. It also enhances the data discovery capabilities for applications that contain no prior knowledge of what data is stored in a DBMS.

The various embodiments of this invention also provide techniques by which a CDT can be made known to the DBMS (including comparisons between CDTs and performing arithmetic operations on CDTs) without applications needing to prescribe the meaning themselves. Instead, applications can pull the meaning (in the form of metadata) from the DBMS itself, specific to a given CDT (not generic, as in the case of LOBs, for example).

In accordance with one embodiment, a CDT uses two pieces to work with a DBMS. The first piece is a definition of the custom data type, such that the application knows how to interpret and use the CDT. In programming languages, such as Java or C/C++, this piece would be the class definition for the custom data type. The second piece is a type converter, which is a piece of code that marshals the byte representation of an object from the DBMS to an object of the CDT defined in the first piece, and vice versa. The type converter also provides a comparison mechanism, which allows the DBMS to filter a data query request based on a search predicate. The combination of these two pieces allows the calling application to understand the CDT and to store and retrieve objects based on the CDTs from the DBMS. As a result, both the CDT and the user type converter can both be fully managed by the DBMS so that a calling application doing data discovery does not need to have any prior knowledge of either component.

The User (UDT, CDT) Type Definition

The various embodiments in accordance with the invention can support two different kinds of UDTs. The first kind of UDT is a compound type. The compound user type definition can be a construct up made from built-in database types, such as integers and strings. One example of a compound user type definition is a street address, as shown below. The address can be broken up into different components: house number, street name, city, state, and zip code. These sub-components can be defined as the following primitive types shown below in Java.

```
public class ADDRESS {
  public int houseNumber;
  public String streetName;
  public String city;
  public String state;
  public int zipCode;
}
```

The User Type Converter

In one embodiment, each user type also requires one or more user type converters (depending on the number of programming languages supported) to translate the binary data representation to and from an instance of the user type. The user type converter implements two methods: a read method for converting from the binary data in the DBMS to a user type object as defined for a specific programming language, and a write method for converting from the user type object to a raw binary format for storing into the DBMS. Each programming language for which the DBMS provides user type support has a well-defined interface for these read and write methods. In some embodiments, a comparison method is also implemented that allows the DBMS to qualify database queries with search qualifications based on the custom type. The type converter is serializable so it can be stored within the DBMS. The following is an example of a sample Java Interface for the Custom Type Converter definition:

```
public interface TypeConverter extends Serializable {
  // Read/Write for Objects
  public Object readObject(byte[ ] ioArea, int start, int length,
Class objectType, Collection<String> warningStrings);
  public void writeObject(byte[ ] ioArea, int start, int length,
Object object, Collection<String> warningStrings);
  public byte[ ] getUnconvertedBytes(byte[ ] ioArea, int start, int
length);
  public void setUnconvertedBytes(byte[ ] destIOArea, int start, int
length, byte[ ] value);
  // Compare operation (may or may not be supported per Converter)
  public int compareTo(Object objectToBeCompared, Object
objectBeingComparedTo);
  // Null operations (may or may not be supported per Converter)
  public boolean isNull(byte[ ] ioArea, int offset);
  public void setNull(byte[ ] ioArea, int offset);
  // Print operation (may or may not be supported per Converter)
  public String toString( );
}
```

The Database Definition for User Types

In one embodiment, both the user defined type definition and the type converter are stored within the DBMS. This allows tooling products, such as data discovery and business intelligence tools, to interpret and inspect the UDT data without any special considerations, such as the need to manually place the type definitions and type converters within the tool's class path. In embodiments where the DBMS includes a catalog, the type definitions and type converters can be stored in this catalog, as the catalog typically will be grouped together with the rest of the metadata information for columns and tables. When creating a database that requires a user data type in the DBMS, the database definition itself will require syntax to load the user data type definition, the type converter, and the programming language in which the definition and type converter is written. In some embodiments, a version number for the user data type can also be included, which allows users to continue enhancing their existing user types. The following is an example of a custom type "DOGBREED," expressed in the Data Definition Language (DDL):

```
CREATE TABLE dogs (
  name            VARCHAR(50) NULL,
  breed
  CUSTOM(DOGBREED(JAVA(\com\ibm\DogBreed.
  class,\com\ibm\DogBreedTyp
  eConverter.class), CSHARP(\DogBreed.o,
  \DogBreedTypeConverter.o))),
)
```

FIG. 1 shows schematically how the "DOGBREED" CDT and type converters are stored in a DBMS (102) in accordance with on embodiment. The table "dogs" (104), as shown above, contains two columns. The first column represents the name of the dog and the second column represents the user type DOGBREED (106). The DOGBREED type (106) has type definitions and converters defined for the programming languages Java and C#. The DBMS (102) processes the Data Description Language (DDL), using a DDL processor (108) and retrieves the custom type definitions at the locations specified in the DDL to be stored in the DBMS Custom Types table.

Retrieving the Custom Defined Type Definition from the DBMS

The following access methods, whether through a JDBC driver or .NET Data provider, grabs the appropriate type definition and type converter. The following is an example for a JDBC driver.

Using standard database discovery methods, the application can determine if there are any user defined types in the DBMS, based on its catalog metadata. The following code shows how database metadata can be used to retrieve information on a Custom Defined Type, which allows the user to identify the User Defined Types and cast it appropriately on a getter or setter. Similar code will be in place for the ResultSetMetadata methods.

```
DatabaseMetadata dbmd = conn.getMetadata( );
ResultSet rs = dbmd.getColumns("myCatalog", "mySchema", "dogs",
"breed");
rs.next( );
System.out.println("Output:");
System.out.println("DATA_TYPE: " + rs.getInt(5)); // Column 5 -
DATA_TYPE
System.out.println("TYPE_NAME: " + rs.getInt(6)); // Column 6 -
TYPE_NAME
```

The following example is an example output for sample Java code and shows how DatabaseMetadata can be used to retrieve information on a Custom Defined Type. The DataType of 1111 signifies a SQL type of "OTHER", which is used to represent a User Type.

```
Output:
DATA_TYPE: 1111          // 1111 signifiesa SQL type of
OTHER
TYPE_NAME: com.ibm.DogBreed
```

Once the user type name is known, the application can optionally request the Connection object for the type definition with the following method:

```
Class<?> userClassDef =
((ConnectionImpl)conn).getUserTypeDefintion("com.ibm.DogBreed");
```

The following code example shows how an implementation of the ConnectionImpl.getUserTypeDefinition(String) method can be implemented:

```
public Class<?> getUserTypeDefinition(String typeName) throws
ClassFormatError {
  byte[ ] buf =
dbmsSpecificMethodToStreamTypeDefinition(typeName);
  return
ClassLoader.getSystemClassLoader( ).defineClass(typeName, buf, 0,
buf.length);
}
```

Figure 2:
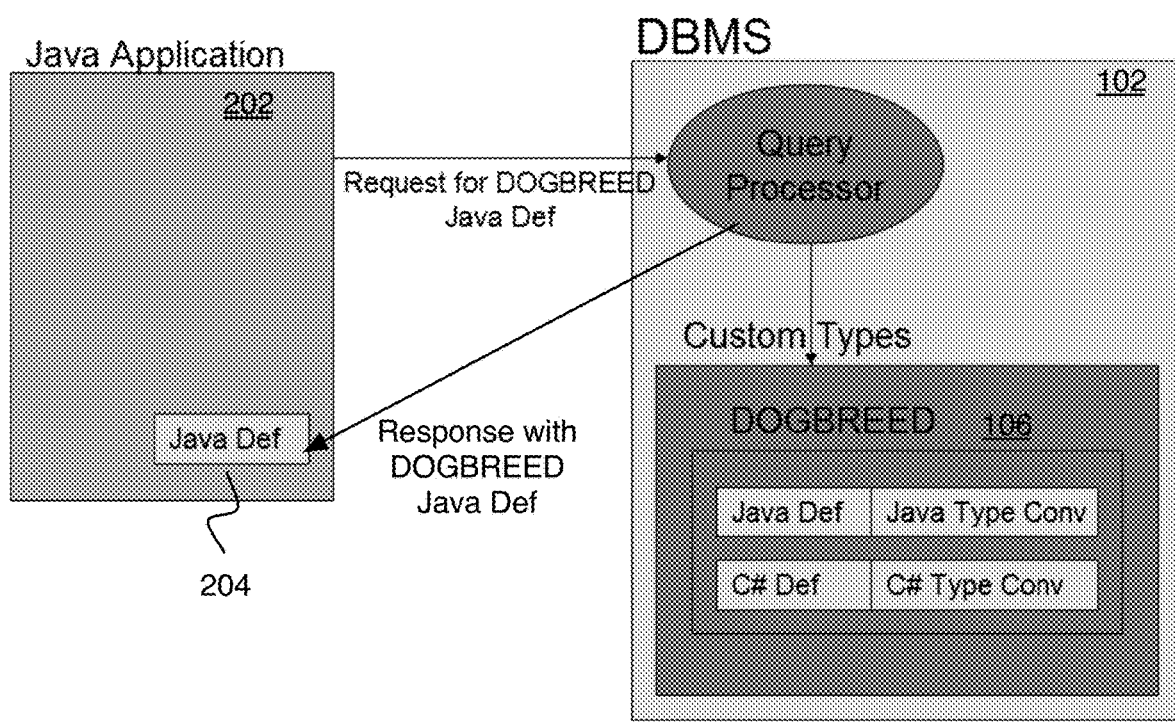
FIG. 2 shows schematically how an application requests a Java definition of a custom data type, in accordance with one embodiment.

FIG. 2 shows schematically how a Java application (202) can request the Java definition of DOGBREED. The application (202) submits a request to the DBMS (102) to retrieve the DOGBREED Java definition. The DBMS (102) inspects the query and sends the Java definition of DOGBREED (106) to the application (202). The Java application (202) then has the Java definition, as indicated by box 204.

Retrieving Custom Defined Types Records

To retrieve the data from the DBMS, the DATA_TYPE value of 1111 signifies to the application that this is of SQL type "OTHER." The following code examples show how to retrieve the user type object instance from the DBMS.

The following sample application requests the column "breed" from the table "dogs."

```
Statement st = conn.createStatement( );
ResultSet rs = st.executeQuery("SELECT breed FROM dogs");
rs.next( );
Object breed = rs.getObject("breed");
```

The ResultSet.getObject(String) and ResultSet.getObject (int) methods add the following implementation to load the appropriate user type converter to translate the data from the DBMS.

```
public Object getObject(String columnLabel) {
  Object result = null;
  if (isUserType(columnLabel) {
    // Load user type converter
    byte[ ] buf =
dbmsSpecificMethodToStreamTypeConverter(typeName);
    ByteArrayInputStream bis = new ByteArrayInputStream(bis);
    ObjectInputStream ois = new ObjectInputStream(bis);
    TypeConverter typeConverter = (TypeConverter)
ois.readObject( );
    Class<?> objectType =
((ConnectionImpl)conn).getUserTypeDefintion("com.ibm.DogBreed");
    result = typeConverter.readObject(ioArea, start, length,
objectType, warningStrings);
  } else {
    // Perform normal processing
    result = ...
  }
  return result;
}
```

Figure 3:
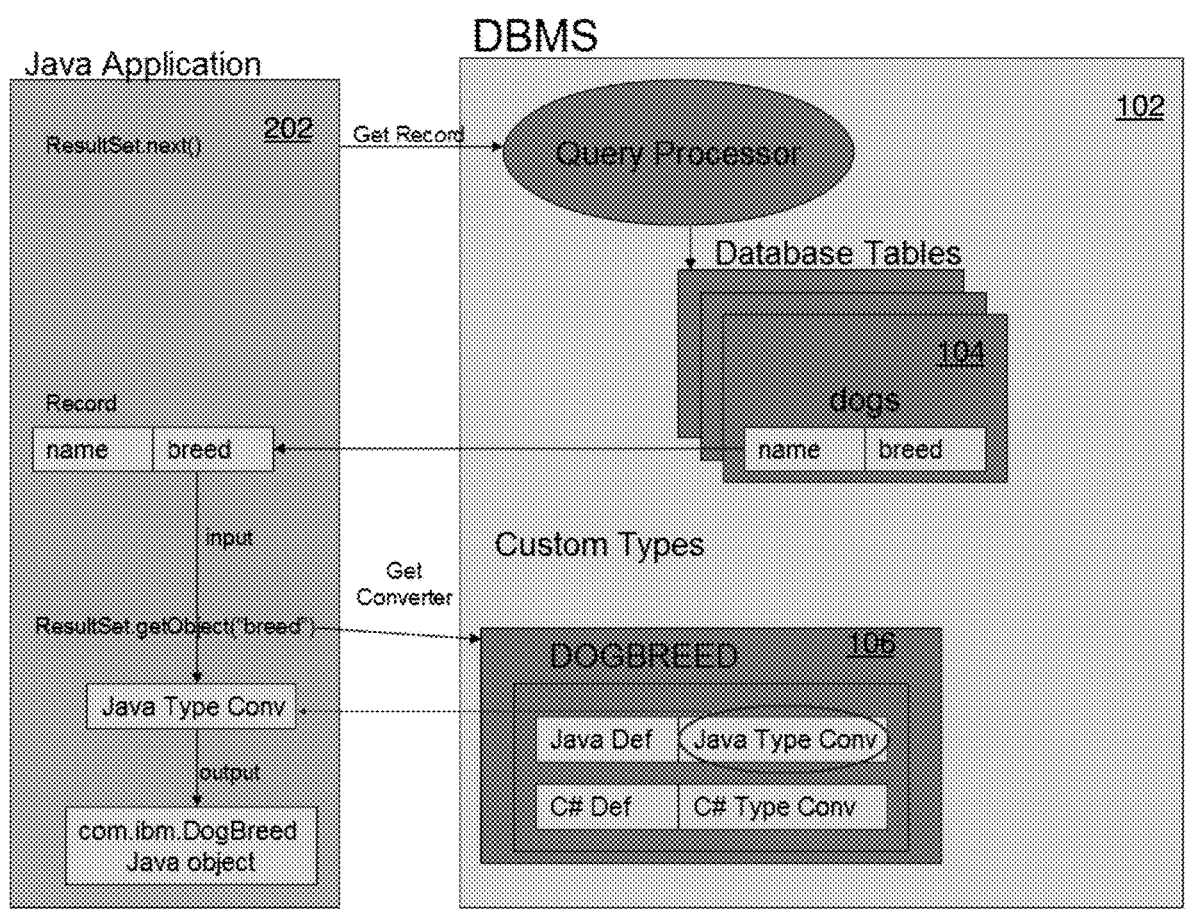
FIG. 3 shows a Java ResultSet processing using the custom data type converter, in accordance with one embodiment.

FIG. 3 shows a Java ResultSet processing using the CDT Converter, in accordance with one embodiment. Here the Java application (102) is doing standard ResultSet processing on the dogs table (104), which contains information on name and breed, as described above. The DOGBREED information (106) is a CDT. As the Java application (102) iterates through the ResultSet, it wants to retrieve the information about the name and breed of that table (104) record. In order to properly materialize the Java DogBreed object, the application (102) needs to get the Java Type Converter for DOGBREED, which converts the binary DOGBREED data into a Java DogBreed object.

The create and update methods perform similarly to the read method described above. Furthermore, similar logic can be applied to other languages and data access protocols, such as the .NET Data Provider for C#, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for managing data conversion for a custom data type in a database system, the computer program product comprising a computer readable storage medium having program code embodied therewith, the program code executable by a processor, to:
   store a custom data type definition and one or more converters within a database management system, each converter being configured to convert instances of the custom data type between a binary format and a specific programming language format;
   receive, by the database management system, a request from an application for a custom data type instance in a specified programming language format;
   respond to the request with:
      the custom data type definition,
      a converter configured to convert instances of the custom data type between the binary format and the requested programming language format, and
      the requested custom data type instance expressed in the binary format; and
   convert, by the application, the custom data type instance expressed in the binary format into a custom data type instance expressed in the specified programming language format using a read method of the converter and the custom data type definition.

2. The computer program product of claim 1, wherein the custom data type definition is a user defined data type definition.

3. The computer program product of claim 2, wherein the user defined type is a compound user type made up from built-in database types.

4. The computer program product of claim 1, further comprising:
   providing a programming language interface for each of the one or more converters to allow calls to the instances of the custom data type.

5. The computer program product of claim 1, wherein the custom data type definition and the one or more converters are stored in a catalog of the database management system.

6. The computer program product of claim 5, further comprising program code executable by the processor to:
   determine whether the database management system contains any custom data type definitions by querying the catalog's metadata.

7. The computer program product of claim 1, further comprising program code executable by the processor to:
   store a version for the custom data type definition.

8. A system for managing data conversion for a custom data type in a database system, comprising:
   a processor; and
   a memory storing instructions that when executed by the processor causes the processor to:
      store a custom data type definition and one or more converters within a database management system, each converter being configured to convert instances of the custom data type between a binary format and a specific programming language format;
      receive, by the database management system, a request from an application for a custom data type instance in a specified programming language format;
      respond to the request with:
         the custom data type definition,
         a converter configured to convert instances of the custom data type between the binary format and the requested programming language format, and
         the requested custom data type instance expressed in the binary format; and
      convert, by the application, the custom data type instance expressed in the binary format into a custom data type instance expressed in the specified programming language format using a read method of the converter and the custom data type definition.

9. The system of claim 8, wherein the custom data type definition is a user defined data type definition.

10. The system of claim 9, wherein the user defined type is a compound user type made up from built-in database types.

11. The system of claim 8, wherein the memory further stores instructions that when executed by the processor causes the processor to:
   provide a programming language interface for each of the one or more converters to allow calls to the instances of the custom data type.

12. The system of claim 8, wherein the custom data type definition and the one or more converters are stored in a catalog of the database management system.

13. The system of claim 12, wherein the memory further stores instructions that when executed by the processor causes the processor to:
   determine whether the database management system contains any custom data type definitions by querying the catalog's metadata.

* * * * *